Figure 1:
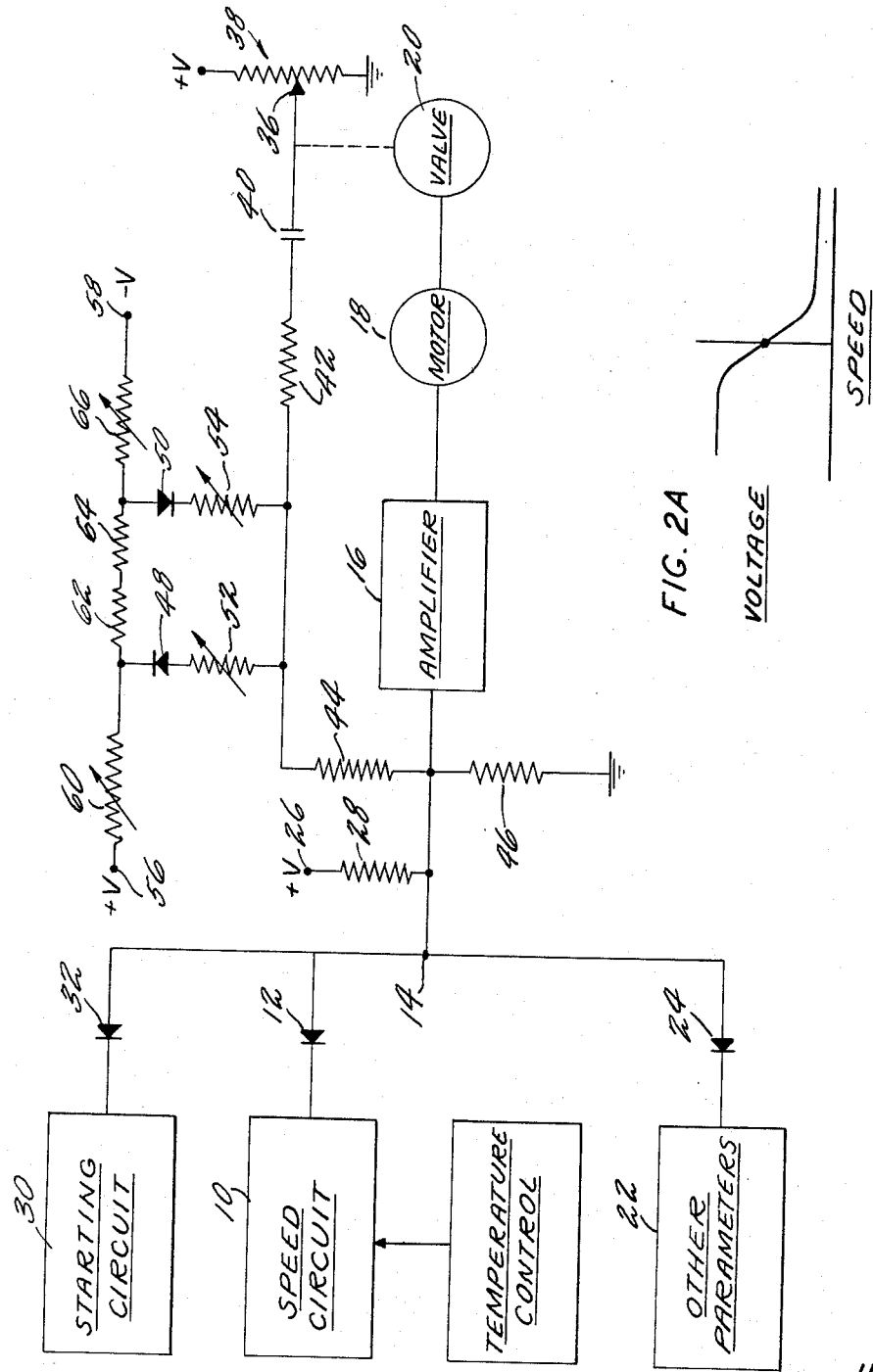

Jan. 21, 1964

H. E. MARTIN 3,119,055

SPEED RESPONSIVE CONTROL SYSTEM

Filed Sept. 6, 1960

3 Sheets-Sheet 1

INVENTOR
HENRY E. MARTIN

BY Donald J. Bradley
AGENT

Jan. 21, 1964 H. E. MARTIN 3,119,055
SPEED RESPONSIVE CONTROL SYSTEM
Filed Sept. 6, 1960 3 Sheets-Sheet 2

INVENTOR
HENRY E. MARTIN
BY Donald F. Bradley
AGENT

Jan. 21, 1964     H. E. MARTIN     3,119,055
SPEED RESPONSIVE CONTROL SYSTEM
Filed Sept. 6, 1960     3 Sheets-Sheet 3
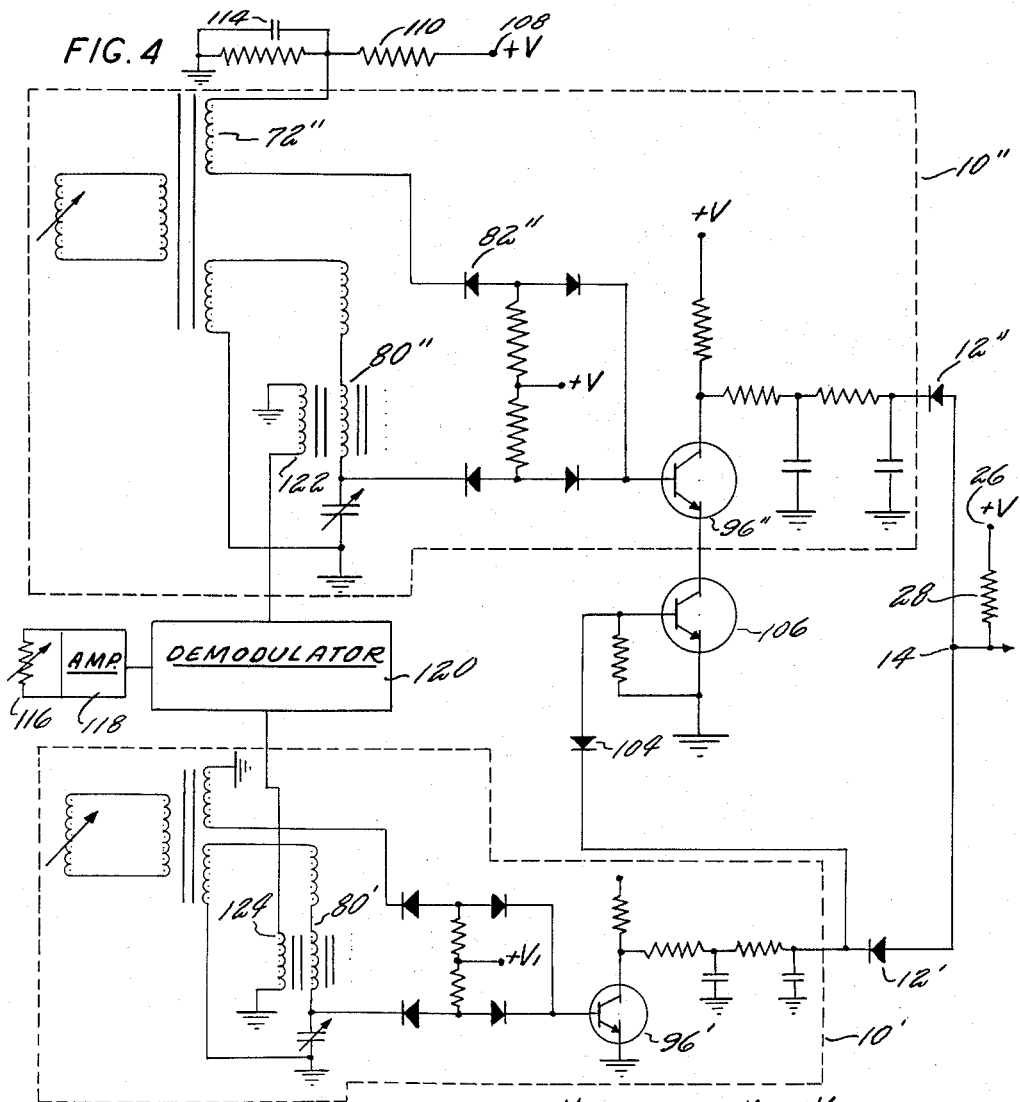
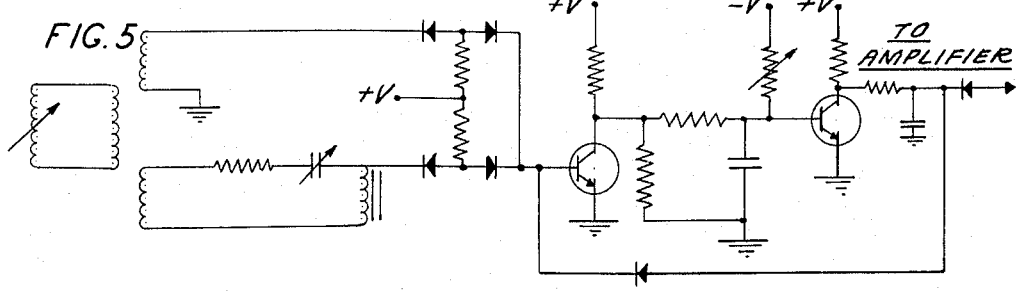
INVENTOR
HENRY E. MARTIN
BY Donald F. Bradley
AGENT

United States Patent Office 3,119,055
Patented Jan. 21, 1964

3,119,055
SPEED RESPONSIVE CONTROL SYSTEM
Henry E. Martin, Wapping, Conn., assignor to United
Aircraft Corporation, East Hartford, Conn., a corporation of Delaware
Filed Sept. 6, 1960, Ser. No. 54,073
21 Claims. (Cl. 318—452)

This invention relates to a control system, and particularly to a system which may be used to provide control signals to a valve or other device and may, for example, regulate the flow of fuel in a fuel control system. The system of this invention is peculiarly adapted to act as a fuel control system for a turbine engine, and is of the type disclosed in copending U.S. application 29,309, entitled "Fuel Control," by T. A. Flanders, filed on May 16, 1960, and assigned to the assignee of this invention.

In the preferred embodiment of this invention, a novel speed or frequency sensing circuit measures the deviation in speed of a turbine engine from a preselected value and provides a control signal to a motor which in turn controls the position of a valve or other device for thus regulating the flow of fuel to the turbine engine. A novel starting circuit is incorporated into the system for preventing the control system from taking effect until a certain minimum preselected speed is attained by the turbine engine. The system may also be controlled or overridden by other parameters such as temperature and pressure.

Novel circuitry is incorporated into the system for regulating the set-point or the speed to which the turbine engine is set by automatically modifying the set-point when inlet temperature or some other critical parameter of operation of the turbine engine reaches a selected value. This circuitry will, for example, respond to temperature and reduce the set-point to a lower speed to prevent overheating of the engine.

A further novel feature of this invention is a redundant circuit which may be used in conjunction with the speed sensing circuits and which will insure that some control is retained by the system in case of a failure in the speed sensing circuits. In addition, a novel rate feedback system is included which will modify the feedback rate as a function of the direction and rate of movement of the controlled valve and thereby give a more desirable time response to the system.

It is, therefore, an object of this invention to provide a novel fuel control system for turbine engines.

Another object of this invention is to provide a novel control system responsive to selected turbine engine operating parameters.

A further object of this invention is to provide a novel fuel control for turbine engines which is responsive to the speed of the turbine engine.

Another object of this invention is to provide a fuel control system for turbine engines having a variable rate feedback for improving the time response of the system.

A further object of this invention is to provide a novel feedback system which will modify the feedback rate as a function of the rate and direction of movement of a controlled object.

Another object of this invention is to provide a novel feedback system having a feedback rate signal which is proportional to the movement of the controlled object in a specified range of operation and in which the rate feedback may be varied when the controlled object is in other than a specified range of operation.

A further object of this invention is to provide a feedback system having a plurality of rate feedback signals, some of which feedback signals may be varied.

Another object of this invention is a simple and inexpensive circuit which will produce an output signal proportional to frequency.

Another object of this invention is an electronic circuit which will produce a direct current output signal proportional to the frequency of an alternating input signal.

A further object of this invention is a novel electronic circuit which will produce a direct current voltage inversely proportional to the speed of a rotating member.

A further object of this invention is an electronic circuit which will provide a signal proportional to the deviation of a frequency or speed signal from a preselected value.

Another object of this invention is a novel electronic circuit which will provide a control signal when the frequency of a variable input attains a specified value.

A further object of this invention is an electronic circuit responsive to speed or frequency which will produce a first output control signal when the speed or frequency is below a preselected value and which will produce a second control signal when the speed or frequency attains said preselected value.

Another object of this invention is to provide a speed sensing circuit including a feedback network for locking the speed circuit into continuous signal generating mode of operation when the speed has attained a preselected value.

A further object of this invention is a frequency or speed sensing circuit for measuring the deviation of an input frequency or speed signal from a preselected value and including means for modifying the preselected frequency or speed as a function of an independent parameter.

Another object of this invention is a speed responsive circuit including a resonant circuit for varying the phase of a signal as a function of speed.

A further object of this invention is a speed responsive circuit including a resonant circuit and means for modifying the resonant point of the resonant circuit as a function of an independent parameter.

Another object of this invention is a novel electronic circuit for actuating a redundant circuit upon failure of a first circuit.

A further object of this invention is a redundant speed circuit including switching apparatus for actuating a second speed circuit upon failure of a first speed circuit.

Another object of this invention is a fail-safe speed circuit for actuating a fuel control including a redundant circuit for assuming control upon failure of a first circuit and biasing apparatus for providing a minimum signal upon failure of the redundant circuit.

Figure 2:
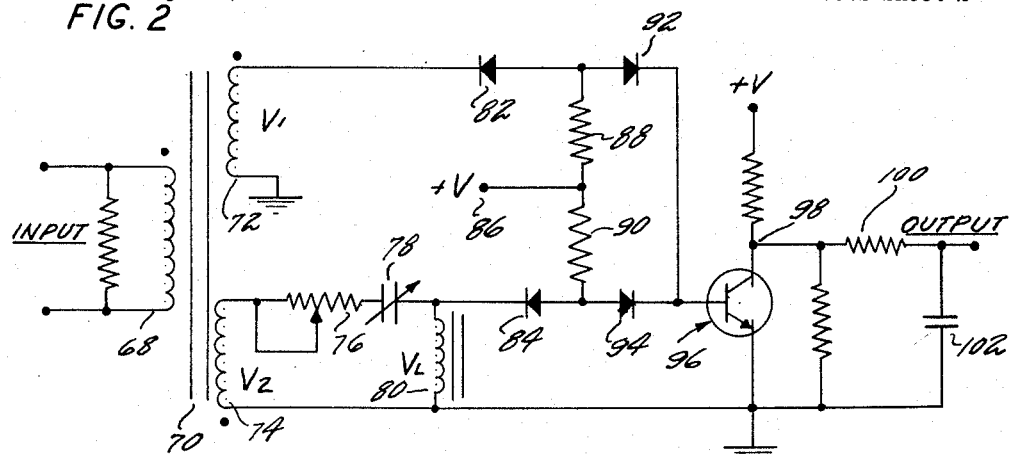
Figure 3:
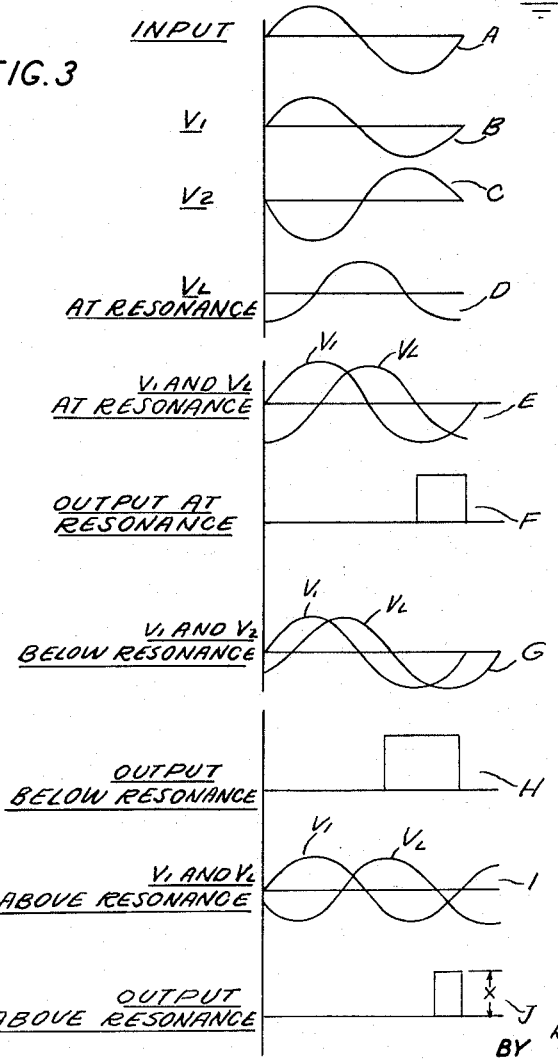

These and other objects and a fuller understanding of the invention may be had by referring to the following description and claims, taken in conjunction with the accompanying drawings in which:

FIG. 1 is a block diagram of the basic fuel control system including a schematic of the feedback system; and FIG. 2 is a schematic drawing of the novel speed circuit of FIG. 1; and FIG. 2A is a plot of output voltage of the speed circuit of FIG. 2 as a function of speed; and FIG. 3 is a plot of the voltage levels in the speed circuit of FIG. 2 under variable conditions of operation; and FIG. 4 is a schematic diagram showing a pair of redundant speed circuits including apparatus for modifying the output of the speed circuits; and FIG. 5 is a schematic diagram of the novel starting circuit of FIG. 1.

In FIG. 1, a speed circuit 10 supplies a signal which is proportional to the deviation of speed from a preselected value of a turbine engine or other rotating member which it is desired to control. The output signal from speed circuit 10 is connected through a diode 12 to a junction 14 where it is amplified through amplifier 16 and applied to a motor 18. Motor 18 is connected to a valve 20 or some other device for controlling a variable of operation of a control system. Valve 20 may be a butterfly type valve for regulating the flow of fuel through a conduit and thereby regulating the speed of the turbine engine. The control system may also be responsive to other conditions of operation, as for example, in a turbine engine, to pressure and temperature conditions. Block 22 is shown connected through diode 24 to junction 14 for providing additional signals to the input of amplifier 16 and controlling the movement of valve 20. The system herein described is primarily responsive to speed signals, and block 22 will, therefore, provide control signals only upon indications of dangerous conditions of operation such as extreme over-temperature or pressure, and will be considered only as an override control to be actuated during emergency situations.

A source of positive voltage 26 is applied to junction 14 through a resistor 28. The resultant signal at junction 14 will, therefore, be the most negative signal from the speed circuit of block 10 or from block 22. A starting circuit 30 will provide the most negative signal to junction 14 through diode 32 and will thus assume control of the system only when the turbine engine is started. As will be described later, the starting circuit 30 becomes disconnected from junction 14 when the turbine engine has reached idling speed, and at this point speed circuit 10 will provide the normal governing signals.

Block 34 which is shown as a temperature control but which may be responsive to other conditions of operation may affect the speed setting of speed circuit 10. The operation of this circuit will be explained in more detail in connection with FIG. 4.

Valve 20 is connected directly to wiper arm 36 of potentiometer 38 which is positioned to be moved with valve 20. The voltage transmitted by arm 36 will, therefore, vary with the position of valve 20. A feedback network includes a differentiating circuit comprising capacitor 40, resistors 42, 44 and 46. The voltage signal from potentiometer 38 is, therefore, transmitted through the feedback circuit to the input of amplifier 16. Because of the differentiating circuit, the signal received by amplifier 16 will be a rate signal. As is well known in the art, the rate feedback circuit thus far described is commonly used to apply a damping signal of opposite polarity from the input control signal, and prevent or minimize the overshoot and oscillatory actions inherent in control systems. However, in all rate feedback systems, the time response of the control, in this case valve 20, is reduced. Novel circuitry has been added to the rate feedback system to allow valve 20 to move rapidly when a large error signal is applied to amplifier 16, but to retain the inherent stability of rate feedback systems when the error signal is not at a maximum value. In other words, for normal conditions of operation, the rate feedback signal will perform its usual function, but when a large error signal calls for extremely rapid valve movement, the feedback will reduce to allow valve 20 to move with as rapid a rate as practicable without resulting in instability.

To obtain this result, a pair of diodes 48 and 50 are connected in opposite polarities to the feedback system through variable resistors 52 and 54. The diodes 48 and 50 are biased to fixed values by sources of potential 56 and 58 and resistors 60, 62, 64 and 66. Assuming, for example, that the maximum error signal from speed circuit 10 to junction 14 and amplifier 16 is +4 volts or −4 volts, diode 50 in this case could be biased by a potential of, for example, −3 volts and diode 48 to +3 volts. If an error voltage of +4 volts were applied to amplifier 16, calling for valve 20 to open, movement of valve 20 at the maximum rate would cause a high rate feedback signal. However, the feedback signal could not go beyond −3 volts because diode 50 would conduct and clamp the feedback voltage to −3 volts. The resultant error signal at the input to amplifier 16 will still call for a valve opening signal. Once the error from speed circuit 10 is reduced below +3 volts, the feedback signal will operate in direct proportion to the valve movement and will not be affected by diodes 48 or 50. The addition of diodes 48 and 50 will thus cause the rate of feedback to be varied during extreme operating conditions, but will not affect the system during normal operations. It is obvious that the bias voltage of diodes 48 and 50 can be varied, and that resistors 52 and 54 can be changed to supply different rates of feedback for positive and negative going signals.

FIG. 2 shows the speed circuit of block 10 in FIG. 1. The function of the speed sensing circuit is to provide to amplifier 16 a direct current voltage which is inversely proportional to speed. A pulse pickup, not shown, produces a sine wave signal and feeds input transformer primary winding 68. This waveform is shown in FIG. 3, curve A. An example of a pulse pickup which can be used is shown in U.S. application Serial No. 825,694, entitled, "Speed Indicator," filed July 8, 1959, to the same inventor and assigned to the same assignee. The pulse pickup will normally sense the high rotor speed of a turbine engine. The frequency of the signal produced by the pickup increases with increased speed of the turbine engine. The circuit of FIG. 2 will be described in terms of speed sensing, but it is obvious that any signal, the frequency of which varies, may be utilized with this circuit.

Secondary winding 72 of transformer 70 receives a resultant signal which is in phase with the input speed signal and at a stepped up voltage. This signal will be referred to as $V_1$, and is shown in FIG. 3, curve B. Secondary winding 74 of transformer 70 receives a resultant signal which is phase shifted by 180° in transformer 70 and is at approximately the same potential as the input signal. This is shown in FIG. 3, curve C and will be referred to as $V_2$.

Signal $V_2$ is fed to a series tuned circuit comprising resistor 76, capacitor 78 and inductor 80. The resultant frequency of the tuned circuit is selected by varying capacitor 78. Resistor 76 adjusts the "Q"

$$\frac{(\omega L)}{R}$$

of the resonant circuit. The adjustment is normally made in setting up the circuit and then remains fixed. A "Q" of ten has been found to be optimum.

The curves of FIG. 3 will be of assistance during the following discussion. When a speed at the circuit resonant frequency is applied to transformer 70, the voltage across inductor 80, which will be referred to as $V_L$, and is shown in FIG. 3, curve D, leads the voltage across winding 74 which is $V_2$, by 90°. Recalling that $V_2$ and $V_1$ are 180° out of phase, consider $V_1$ a reference and note that $V_1$ leads $V_L$ by 90°. At speeds above resonance, $V_2$ becomes an inductive circuit and $V_L$ leads $V_2$ by less than 90°. Consequently, $V_1$ leads $V_L$ by greater than 90°. The speeds below resonance, $V_2$ becomes a capacitive circuit and the shift between $V_1$ and $V_L$ decreases to less than 90° since $V_L$ leads $V_2$ by more than 90°. The basic action results in a phase shifting of $V_L$ with respect to $V_1$ that changes with speed about a reference point of 90°.

$V_1$ and $V_L$ are connected to diodes 82 and 84. When $V_L$ or $V_1$ are positive, their respective diodes 82 or 84 are blocked because each diode anode is connected to a source of positive potential 86 through resistors 88 and 90. At this time, diodes 92 and 94, in series with diodes 82 and 84 but oppositely poled, are conducting through the base-emitter circuit of transistor 96 from positive voltage source 86 through resistors 88 and 90. A positive potential at the base junction of transistor 96 causes the transistor to conduct and causes collector voltage saturation resulting in near ground potential at collector junction 98. The output voltage, after filtering, is therefore at a very low level.

When inputs $V_1$ and $V_L$ swing negative, diodes 82 and 84 can conduct the negative voltage and diodes 92 and 94 become blocked to base current and transistor 96 is thus turned off. When this occurs, collector junction 98 rises to a high positive potential. The transistor 96 is cut off only during the time interval when both $V_1$ and $V_L$ are negative since if either $V_1$ or $V_L$ are positive, base current flows. Transistor 96 can be considered as a switch in which the ratio of "ON" to "OFF" time is controlled by the phase relationship between the input signals $V_1$ and $V_L$. The "OFF" time increases as the phase angle between $V_1$ and $V_L$ decreases, and conversely the "OFF" time decreases as the phase angle increases. FIG. 3, curves E and F, shows the phase relationship between $V_1$ and $V_L$ at resonance and the width of the output pulse at resonance. FIG. 3, curves G and H, shows the phase relationship between $V_1$ and $V_L$ below resonance, and the width of the output pulse for speeds below the resonance frequency. FIG. 3, curves I and J, shows $V_1$ and $V_L$ above resonance and the output pulse and frequencies above resonance.

Since the amount of energy or the direct current level of the output pulse is equal to the area under the pulse, or correspondingly the product of amplitude and time, and since the amplitude is constant when transistor 96 is "OFF," then the average direct current output is a function of the "OFF" time of transistor 96 only. Transistor 96 then produces constant amplitude, variable width unidirectional pulses which, when filtered by a network such as resistor 100 and capacitor 102, results in a direct current output. Selecting a new speed reference by adjusting the resonant frequency merely translates the characteristics of the output to the new point. Since resonant frequency is the desired operating point, then for zero error signal to the servo amplifier 16 of FIG. 1, it becomes necessary to provide a fixed reference in such a manner that amplifier input or error signal is zero for "ON speed" engine conditions.

FIG. 2A shows a plot of the output voltage of speed sensing circuit 10 with time. For speeds below resonance, the voltage output is high, while for speeds above resonance the output is low. The voltage changes between the knees of the curve take place within approximately 4 percent of the speed range, resulting in sharp response near resonance. The underspeed voltage is normally about +12 volts, while the overspeed voltage is about +4 volts.

FIG. 4 shows a pair of speed setting circuits as described in FIG. 2 modified and connected together in a redundant type circuit so that a failure of the main control or primary circuit will automatically institute the functioning of the redundant circuit, and thereby provide a fail-safe feature to the control system. Circuit 10' of FIG. 4 is the basic speed sensing circuit of FIG. 2, modified only by a bias control to be described hereinafter. Failure of the turbine engine speed signal, the pulse pickup attached thereto, or any component of circuit 10' which results in transistor 96' being in a continuous nonconducting state will result in a high positive signal from circuit 10'. As shown in FIG. 2A, when the speed circuit is properly functioning, the average direct current output signal is somewhat above ground, between +4 and +12 volts D.C. During this time, diode 12' of FIG. 4 will be conducting because source 26 will be at a more positive potential. When a malfunction occurs in circuit 10', and the output voltage therefrom attains a high positive value, zener diode 104 is reversed biased above the zener breakdown point and conducts in the reverse direction, and the positive output from transistor 96' is applied to the base junction of transistor 106 to thereby render transistor 106 conductive. Speed sensing circuit 10'', which is normally inoperative because transistor 96'' has no reference point at its emitter junction, is now rendered conductive because conducting transistor 106 is a low impedance path to ground for the emitter junction of transistor 96''. Diode 12'', which is normally reverse biased because of the high positive collector supply voltage of transistor 96'', becomes conductive when transistor 96'' is turned "ON," and redundant speed circuit 10'' will now assume control. Since the output of circuit 10' is now a high positive potential, diode 12' will be blocked.

As a further feature of the redundant circuitry, a bias supply voltage from source 108, resistance dividers 110 and 112 and smoothing capacitor 114, is supplied to secondary winding 72'' of speed circuit 10''. If a failure occurs in circuit 10'' so as to adversely affect the fuel control system, the positive bias supply will be fed through secondary winding 72'' to block diode 82'' and render transistor 96'' continuously conductive. When this occurs, the output from the collector of transistor 96'' will assume a near ground potential, which as shown in FIG. 2A, will indicate to servo amplifier 16 an overspeed signal, with the result that the valve 20 will close to an idling condition and the fuel control system will remain idling until the malfunctions have been corrected. The circuit of FIG. 4 is, therefore, a double fail-safe type circuit which will insure that possible failures in the speed sensing circuits will not cause damage to the turbine engine.

FIG. 4 also shows how the preselected resonant frequency of the speed sensing circuit 10' and 10'' may be modified as a function of an independent parameter. A parameter such as turbine inlet temperature is sensed by an element such as a thermistor 116. The alternating temperature signal may be amplified by amplifier 118 and converted into a direct current signal by demodulator 120. The direct current temperature signal can be connected through windings 122 and 124 to bias inductors 80' and 80'', and thus vary the inductance of these elements. Windings 122 and 124 would generally be connected so that any bias current therethrough would change the inductance of elements 80' and 80'' in a direction to lower the resonant frequency of the corresponding resonant circuits. The circuitry can be arranged so that bias current flows through windings 122 and 124 only when the turbine inlet temperature rises above a specified value, so that the resonant frequency of these circuits will not be changed until a critical turbine inlet temperature is reached. The circuitry might also be connected in such a way that windings 122 and 124 receive a predetermined bias current for an average operating temperature of the turbine inlet. In this way, the bias current could vary around the predetermined value and would vary the resonant frequency above or below the fixed value as a function of inlet temperature. However, the basic function of such an arrangement would be to decrease the resonant frequency and thus decrease the speed at which the turbine is controlled only if the turbine inlet temperature rises above a critical level.

FIG. 5 is a schematic diagram of the starting circuit shown in block 30 of FIG. 1. The basic circuit structure is similar to the speed sensing circuit described in detail in FIG. 2, where corresponding reference numerals refer to corresponding parts. Referring again to FIG. 2A, it is seen that the output signal from the speed circuit is at its most positive potential during under speed conditions. Assume, therefore, that upon starting the turbine engine, speed circuit 10 of FIG. 1 would deliver a relatively high output control signal indicating that the turbine engine was well below the desired speed and valve 20 would open wide to allow maximum fuel delivery to the engine. It has been found that rapid temperature buildup within a turbine engine, which would accompany rapid fuel delivery thereto, is detrimental to the engine, and it is better to allow the engine to build up gradually to an idling condition before allowing the control signal from speed circuit 10 to assume control. The circuit of FIG. 5 will deliver a more negative signal to amplifier 16 than would speed circuit 10, and the amplifier will interpret the signal as an overspeed signal and call for valve closing movement until the turbine engine has reached idling speed. After this point has been reached, the starting circuit 30 will thereafter be effectively disconnected from the control system and speed circuit 10 will assume control.

In FIG. 5, a source of negative potential 126 is applied through a variable resistor 128 and algebraically added to the filtered direct current output of transistor 96, and the resultant signal will be applied to the base junction of a transistor 130. The resonant frequency of the starting circuit of FIG. 5 and the source of negative potential 126 will be selected so that transistor 130 will switch from normally conducting for speeds below idling to nonconducting for speeds above idling. Recalling that the normal underspeed signal from the speed circuit is approximately +12 volts, and that the normal overspeed signal is approximately +4 volts, the output signal from the speed circuit at the resonant circuit speed will be approximately +8 volts. If source 126 is selected to be −8 volts, for underspeed signals the sum of the output signal from transistor 96 and source of potential 126 will be about +4 volts, and transistor 130 will be conducting at this time. When transistor 130 is conducting the collector junction 132 will be saturated near ground potential. A feedback loop including a diode 134 is connected between the output of transistor 130 to the base of transistor 96. Since the output of transistor 130 at this time is at ground potential, and since the base junction of transistor 96 will be effective at or above ground potential, diode 134 will be reverse biased and no feedback action will take place. Diode 32 is connected to the feedback line and will transmit the near ground output of transistor 130 to amplifier 16, and the amplifier will respond as though an extreme overspeed signal were present and valve 20 will remain closed.

When the turbine engine speed approaches idling condition, the average output from transistor 96 will drop from +12 volts to approximately +8 volts at resonance. When this signal is added to the −8 volts from the source 126, the sum of the signals is approximately zero volts and transistor 130, which was heretofore conducting, will now be cut off. Collector 132 will correspondingly rise to a high positive potential and feedback diode 134 will transmit this positive output voltage to the base junction of transistor 96. Transistor 96 will thereafter be continuously conducting and saturated and the average output voltage from collector junction 98 will drop below +4 volts and remain near ground. Negative potential source 126 will thus continuously bias transistor 130 to its off state, and collector 132 will remain at a high positive value. The feedback loop including diode 134 thus will clamp transistor 96 to conduction and this will result in a continuously high positive output from transistor 132. Diode 32 to the servo amplifier is now reverse biased and blocked, so that thereafter the starting circuit can no longer assume any control over the fuel control system.

Although the invention has been described as being limited to a fuel control for turbine engines, it is understood that the present disclosure has been made only by way of example and that numerous changes in the details of construction and the combination and arrangement of parts may be resorted to without departing from the spirit and scope of the invention as hereinafter claimed.

I claim:

1. A frequency sensing circuit comprising means for providing an input signal of variable frequency, means acting on said input signal for providing first and second signals including a resonant circuit for varying the phase of said second signal relative to said first signal as a function of frequency, transistor means, means for rendering said transistor means normally conductive, and means for applying said first and second signals to said transistor means and rendering said transistor means non-conductive when both said first and second signals are simultaneously of a given polarity to thereby provide an output signal proportional to the phase relationship between said first and second signals.

2. A frequency sensing circuit comprising a variable frequency input signal, means acting on said input signal for producing a reference signal and a variable phase signal 180° out of phase with said reference signal, a resonant circuit for shifting the phase of said variable phase signal so that at the resonant frequency said variable phase signal is separated from said reference signal by approximately 90°, a transistor, means for rendering said transistor normally conductive, and means for applying said reference signal and said variable phase signal to said transistor simultaneously so that said transistor is rendered non-conductive when both said signals are simultaneously of a given polarity and thereby provide an output from transistor proportional to the phase relationship between said signals.

3. A frequency sensing circuit comprising a variable frequency input signal, means acting on said input signal for producing a reference signal and a variable phase signal 180° out of phase with said reference signal, a resonant circuit for shifting the phase of said variable phase signal so that at the resonant frequency said variable phase signal is separated from said reference signal by approximately 90°, said variable phase signal being separated from said reference signal by more than 90° when the frequency of said variable phase signal is lower than the resonant frequency and less than 90° when the frequency is higher than the resonant frequency, a transistor, means for rendering said transistor normally conductive, and means for applying said reference signal and said variable phase signal to said transistor simultaneously so that said transistor is rendered non-conductive when both said signals are simultaneously of a given polarity and thereby provide an output from transistor proportional to the phase relationship between said signals.

4. A frequency sensitive circuit comprising a variable frequency input signal, means acting on said input signal for producing a reference signal and a variable phase signal 180° out of phase with said reference signal, a series resonant circuit including a series capacitor and a shunt inductor, means applying said variable phase signal to said resonant circuit and shifting the phase of said variable phase signal so that at the resonant frequency the signal across said inductor lags said reference signal by approximately 90°, a normally conductive transistor, means for simultaneously applying said reference signal and said lagging variable phase signal to said transistor, and means including a series diode for passing said applied signals to said transistor and thereby cutting off said transistor only when both said signals are simultaneously of a given polarity, said transistor thereby providing an output signal proportional to the phase difference between both said signals.

5. A frequency sensing circuit comprising a variable frequency input signal, means acting on said input signal and producing therefrom a reference signal and a variable phase signal, said variable phase signal being 180° out of phase with said reference signal, a resonant circuit including an inductor for shifting the phase of said variable phase signal so that said variable phase signal lags said reference signal by approximately 90° at resonance, output means including a normally conducting transistor, and circuit means including a series diode for cutting off said transistor and providing therefrom an output signal proportional to frequency when said reference signal and said variable phase signal are simultaneously of a given polarity.

6. A speed sensing circuit comprising means supplying an input signal having a frequency proportional to speed, means for providing from said input signal first and second signals including a resonant circuit for shifting the phase of said second signal with respect to said first signal as a function of speed, output means including a normally conducting transistor, circuit means for cutting off said transistor and providing therefrom an output signal proportional to speed when said first and second signals are simultaneously of a given polarity, and biasing means for actuating said transistor and providing therefrom a continuous overspeed signal upon failure of said input signal supply means.

7. A control system comprising a first frequency sensing circuit for generating a first control signal, a normally inactive second frequency sensing circuit for generating a second control signal, a connecting circuit including switching means coupling said first and second frequency sensing circuits, said switching means being actuated upon failure of said first circuit to supply to said second circuit a signal for activating said second circuit, and biasing means connected with said second circuit for maintaining said second control signal at a safe level upon failure of said second circuit.

8. A control system as in claim 7 where said switching means includes a zener diode and a transistor.

9. A control system comprising a first frequency sensing circuit for generating a first control signal, a normally inactive second frequency sensing circuit for generating a second control signal, connecting circuit means including a zener diode coupling said first and second frequency sensing circuits, said zener diode being biased to its zener breakdown region upon failure of said first circuit to supply to said second circuit a signal for activating said second circuit, and biasing means connected with said second circuit for maintaining said second control signal at a safe level upon failure of said second circuit.

10. A control system comprising variable frequency signal generating means, first means for sensing said variable frequency signal and supplying said signal to a first frequency sensing circuit for producing a first control signal, second pickup means for sensing said variable frequency signal and supplying said signal to a second normally inactive frequency sensing circuit for producing a second control signal upon actuation of said second frequency sensing circuit, connecting circuit means including a zener diode coupling said first and second frequency sensing circuits, said zener diode being biased to its zener breakdown region upon failure of said first pickup means to supply to said second frequency sensing circuit a signal for activating said second circuit, and biasing means connected with said second circuit maintaining said second control signal at a safe level upon failure of said second pickup means.

11. A control system comprising a first frequency sensing circuit for generating a first control signal, a normally inactive second frequency sensing circuit for generating a second control signal, connecting circuit means including a zener diode and a normally non-conducting transistor coupling said first and second frequency sensing circuits, said zener diode being biased to its zener breakdown region upon failure of said first circuit to supply to said transistor a signal for turning on said transistor and thereby providing an actuating signal for activating said second circuit, and biasing means connected with said second circuit for maintaining said second control signal at a safe level upon failure of said second circuit.

12. In a control system, a frequency sensing circuit for producing a control signal when the frequency of an input attains a predetermined value comprising a variable frequency input signal, circuit means acting upon said input signal for producing a signal proportional to the frequency of said input signal, a biasing signal, means including a summing network for algebraically adding said biasing signal and said frequency proportional signal to produce a resultant signal, output means responsive to said resultant signal for producing an output signal when said resultant signal attains a specified value, and feedback means responsive to said output signal for modifying said frequency proportional signal and producing a resultant signal continuously at said specified value to thereby continuously generate said output signal.

13. A frequency sensing circuit as in claim 12 and including means to vary said biasing signal.

14. In a control system, a frequency sensing circuit for producing a control signal when the frequency of an input attains a predetermined value comprising a variable frequency input signal, circuit means acting upon said input signal for producing a signal inversely proportional to the frequency of said input signal, a biasing signal means including a summing network for algebraically adding said biasing signal and said frequency proportional signal to produce a resultant signal, output means including a transistor responsive to said resultant signal for producing an output signal when said resultant signal attains a specified value, said biasing signal being selected so that said resultant signal will attain the specified value and actuate said output means only when the frequency of said input signal rises to a predetermined value, and feedback means responsive to said output signal for modifying said frequency proportional signal and producing a resultant signal continuously at said specified value to thereby continuously generate said output signal.

15. In a control system, a frequency sensing circuit for producing a control signal when the frequency of an input attains a predetermined value comprising a variable frequency input signal, circuit means acting on said input signal for producing a direct current signal inversely proportional to the frequency of said input signal, an output circuit including a transistor, a biasing signal of opposite polarity from said frequency proportional signal, means to apply said biasing signal and said frequency proportional signal to said transistor simultaneously to supply an output signal from said transistor when said frequency proportional signal attains a specified value, and feedback means including a diode responsive to said output signal for modifying said circuit means and producing a frequency proportional signal continuously at said specified value to thereby continuously generate said output signal.

16. A frequency sensing circuit comprising a variable frequency input signal, a transformer having a primary winding and first and second secondary windings, said input signal being connected to said primary winding and producing from said first secondary winding a reference voltage 180° out of phase with said input signal, a resonant circuit including a capacitor and an inductor connected across said second secondary winding, the variable phase voltage across said inductor at the resonant frequency being separated by 90° from said reference voltage, a transistor, means for rendering said transistor normally conductive, and means for applying said variable phase voltage and said reference voltage to said transistor to render said transistor non-conductive only when both said voltages are simultaneously of one polarity to thereby produce an output from said transistor proportional to the frequency of said input signal.

17. A frequency sensing circuit as in claim 16 in which said inductor comprises a coil, said circuit also including a bias winding, means responsive to temperature for producing a D.C. current in said bias winding, and means for coupling said bias winding to said coil to thereby vary the inductance of said inductor and regulate the resonant frequency of said resonant circuit.

18. A frequency sensing circuit comprising a variable frequency input signal, a transformer having a primary winding and first and second secondary windings, said input signal being connected to said primary winding and producing from said first secondary winding a reference voltage 180° out of phase with said input signal, a resonant circuit including a capacitor and an inductor connected across said second secondary winding, the variable phase voltage across said inductor at the resonant frequency being separated by 90° from said reference voltage, a transistor, a first series circuit connected between said first secondary winding and said transistor, a second series circuit connected between said inductor and said transistor, each said series circuit comprising a pair of oppositely poled diodes having their anodes joined together, a source of D.C. voltage, and a resistor connected between said D.C. voltage source and the junction between each pair of diodes, said D.C. voltage source supplying a bias to said transistor to render said transistor normally conductive, said series circuits passing said reference voltage and said variable phase voltage to said transistor to render said transistor nonconductive only when both said voltages are simultaneously of one polarity.

19. In a control system for a controlled device, said control system including a circuit having a capacitor and a resistor in series to produce a rate feedback signal across said resistor proportional to the rate of movement of said controlled device, means for regulating the magnitude of said rate feedback signal and for varying the rate of said feedback signal when said feedback signal is beyond a predetermined value comprising a pair of diodes connected in parallel with each other, one terminal of each diode being connected to the junction between said resistor and said capacitor, each diode of said pair being poled to conduct in opposite directions, a source of potential connected to the other terminal of each diode, means to selectively vary the potential applied to each diode, and variable resistor means connected in series with each diode for varying the feedback rate when said diodes conduct.

20. A control system as in claim 19 in which the means to selectively vary the potential applied to each diode includes an adjustable resistor connected with said source of potential.

21. A frequency sensing circuit comprising a variable frequency input signal, a transformer having a primary winding and a first and second secondary windings, said input signal being connected to said primary winding and producing from said first secondary winding a reference voltage 180° out of phase with said input signal, a resonant circuit including a capacitor and an inductor connected across said second secondary winding, the variable phase voltage across said inductor at the resonant frequency being separated by 90° from said reference voltage, an output circuit, means for selectively applying said variable phase voltage and said reference voltage to said output circuit to produce an output signal proportional to the frequency of said input signal, means responsive to temperature for producing a D.C. bias signal, and means for applying said D.C. bias signal to said resonant circuit to vary the resonant frequency as a function of temperature.

References Cited in the file of this patent

UNITED STATES PATENTS

| | | |
|---|---|---|
| 2,351,759 | Grundmann et al. | June 20, 1944 |
| 2,682,633 | Woerdemann | June 29, 1954 |
| 2,685,670 | Horrell | Aug. 3, 1954 |
| 2,796,569 | McDonald | June 18, 1957 |
| 2,798,993 | Dion | July 9, 1957 |
| 2,956,234 | Olsen | Oct. 11, 1960 |
| 3,041,535 | Cochran | June 26, 1962 |
| 3,059,163 | Kenny et al. | Oct. 16, 1962 |